(12) United States Patent
Zhang et al.

(10) Patent No.: US 11,598,553 B2
(45) Date of Patent: Mar. 7, 2023

(54) FILTER, MANUFACTURING METHOD FOR FILTER AND AIR CONDITIONER

(71) Applicants: GD MIDEA HEATING & VENTILATING EQUIPMENT CO., LTD., Foshan (CN); MIDEA GROUP CO., LTD., Foshan (CN)

(72) Inventors: Tiegang Zhang, Foshan (CN); Yongfeng Xu, Foshan (CN); Tongbing Lao, Foshan (CN); Yandong Wu, Foshan (CN); Shiqiang He, Foshan (CN); Chunlei Cui, Foshan (CN)

( * ) Notice: Subject to any disclaimer, the term of this patent is extended or adjusted under 35 U.S.C. 154(b) by 478 days.

(21) Appl. No.: 16/631,822

(22) PCT Filed: Dec. 27, 2018

(86) PCT No.: PCT/CN2018/124324
§ 371 (c)(1),
(2) Date: Jan. 16, 2020

(87) PCT Pub. No.: WO2020/000964
PCT Pub. Date: Jan. 2, 2020

(65) Prior Publication Data
US 2020/0149777 A1    May 14, 2020

(30) Foreign Application Priority Data

Jun. 27, 2018 (CN) .......................... 201810676450.0
Jun. 27, 2018 (CN) .......................... 201821004410.3
Jun. 27, 2018 (CN) .......................... 201821005858.7

(51) Int. Cl.
*F24F 13/28* (2006.01)
*B01D 46/00* (2022.01)
(Continued)

(52) U.S. Cl.
CPC .......... *F24F 13/28* (2013.01); *B01D 46/0005* (2013.01); *F24F 13/0209* (2013.01);
(Continued)

(58) Field of Classification Search
CPC ............ B01D 46/0012; B01D 46/0005; F24F 13/0209; F24F 13/0254; F24F 13/20; F24F 13/28
(Continued)

(56) References Cited

U.S. PATENT DOCUMENTS 5,635,058 A * 6/1997 Bowman ................ B01D 61/10
138/120
2011/0132817 A1 * 6/2011 Gardner ................ B01D 35/02
210/411

FOREIGN PATENT DOCUMENTS

CN    201482295 U    5/2010
CN    204006844 U    12/2014
(Continued)

OTHER PUBLICATIONS

Machine translation of JP 2004150586.*
International Search Report dated Apr. 2, 2019 in the corresponding International Application No. PCT/CN2018/124324.

*Primary Examiner* — Vivek K Shirsat
(74) *Attorney, Agent, or Firm* — Kilpatrick Townsend & Stockton, LLP

(57) ABSTRACT

A filter, a manufacturing method for a filter, and an air conditioner are provided. The filter includes a casing (10), a transition tube (20), and a filter screen assembly (30). The filter screen assembly (30) is provided in the casing (10), fitted with and connected to an inner wall of the casing (10), the casing (10) is an integrally formed piece, and two axial (Continued)

ends of the casing (10) have neck sections (11), and two neck sections (11) are both fixedly connected to the transition tube (20).

13 Claims, 8 Drawing Sheets

(51) Int. Cl.
    *F24F 13/02*     (2006.01)
    *F24F 13/20*     (2006.01)
    *B23K 103/04*     (2006.01)
    *B23K 103/12*     (2006.01)
    *B23K 11/11*     (2006.01)

(52) U.S. Cl.
    CPC .......... *F24F 13/0254* (2013.01); *F24F 13/20* (2013.01); *B23K 11/11* (2013.01); *B23K 2103/05* (2018.08); *B23K 2103/12* (2018.08)

(58) Field of Classification Search
    USPC .......................................................... 55/492
    See application file for complete search history.

(56) References Cited

FOREIGN PATENT DOCUMENTS

| | | |
|---|---|---|
| CN | 204841230 U | 12/2015 |
| CN | 105299976 A | 2/2016 |
| JP | H06235570 A | 8/1994 |
| JP | 2004150586 A | 5/2004 |
| WO | 03064941 A1 | 8/2003 |

\* cited by examiner

FILTER, MANUFACTURING METHOD FOR FILTER AND AIR CONDITIONER

CROSS-REFERENCES TO RELATED APPLICATIONS

The present disclosure is a national phase application of International Application No. PCT/CN2018/124324, filed on Dec. 27, 2018, which claims the priorities of Chinese Applications No. 201810676450.0, 201821005858.7 and 201821004410.3 filed in the Chinese Patent Office on Jun. 27, 2018, the entireties of which are herein incorporated by reference.

FIELD

The present disclosure relates to the field of air conditioning equipment, and more particularly, to a filter, a manufacturing method for a filter, and an air conditioner.

BACKGROUND

A conventional filter for an air conditioner mainly has a structure of carbon steel, which means a casing of the filter is assembled by carbon steel, and the casing is welded to a transition tube, resulting in tedious machining processes. The casing generally needs coating on its surface due to that carbon steel material is easy to rust. There are strict requirement of powers for spraying operations, resulting in tedious steps of the processes and affecting the production efficiency of filters. In addition, the casing is welded to the transition tube at a very low temperature, the coating on the casing is easy to burn out when the filter is welded to an external copper tube in the later period, resulting in risks of leakage between the casing and the transition tube. Furthermore, the conventional filter has a short casing, resulting in small area of a filter screen in the casing and poor filtering effect.

In addition, the conventional filter for an air conditioner generally comprises the casing and a filter screen assembly arranged in the casing. The filter screen assembly is in the shape of a funnel, a metal support is usually added in an inner surface of the funnel filter screen in order to enhance the strength of the funnel filter screen. Since the added metal support is an integrally formed cross, raw materials are wasted due to this kind of design. The tensile length is generally limited because the material is limited by extendibility, resulting in an over-small effective filtering area of the filter screen assembly, furthering causing that the filtering effect of the filter screen assembly become poor.

SUMMARY

The present disclosure seeks to solve at least one of the problems existing in the related art to at least some extent.

Embodiments of the present disclosure provide a filter.

Another embodiment of the present disclosure provides a manufacturing method for a filter.

Still another embodiment of the present disclosure provides an air conditioner.

A filter according to embodiments of the present disclosure include: a casing; a transition tube; and a filter screen assembly provided in the casing, fitted with and connected to an inner wall of the casing, the casing being an integrally formed piece, two axial ends of the casing have neck sections, and two neck sections being fixedly connected to the transition tube.

As for the filter according to embodiments of the present disclosure, the casing is the integrally formed piece, splicing process is needless, on the premise that the strength and filtering effects of the filter are satisfied, steps for manufacturing the casing can be simplified, and the production efficiency of the casing can be raised.

In some embodiments, the neck section includes a tapered section having a gradually reduced diameter and a straight tube section, the straight tube section is connected to the tapered section and arranged in an axial direction, and the transition tube is fixedly connected to the straight tube section.

In some embodiments, the transition tube is fixed to the straight tube section by welding.

In some embodiments, the transition tube is embedded into the straight tube section, and an outer wall of the transition tube in contact with the straight tube section is provided with drawing lines.

In some embodiments, an outer end of the transition tube is flushed with an end of the straight tube section.

In some embodiments, an outer end of the transition tube extends out of the straight tube section and forms a connecting section.

In some embodiments, an outer end of the transition tube extends out of the straight tube section and forms a covering section, the covering section abuts against an end of the straight tube section, and an outer wall of the covering section is flushed with an outer wall of the straight tube section.

In some embodiments, the filter screen assembly is fixed to the inner wall of the casing by welding.

In some embodiments, at least one annular groove sunken towards the inner wall of the casing is defined on an outer wall of the casing by punching, the inner wall of the casing is provided with an annular protrusion protruding out at a position corresponding to the annular groove, and the filter screen assembly is connected to the annular protrusion by snapping.

In some embodiments, the casing is integrally formed from stainless steel or copper.

In some embodiments, the filter screen assembly includes a cylindrical filter screen, an outer fixing ring, an inner fixing ring and a support; the inner fixing ring is fixedly connected into the outer fixing ring, the cylindrical filter screen has an opening, a circumferential edge of the opening is interposed between the inner fixing ring and the outer fixing ring; the support includes at least one U-shaped support strip, each U-shaped support strip extends into the cylindrical filter screen through the opening and supports the cylindrical filter screen, and two tail ends of each U-shaped support strip are both fixedly connected to the inner fixing ring.

In some embodiments, the two tail ends of each U-shaped support strip are both bent into edgefolds, and the edgefold abut against the inner fixing ring and are fixed to the inner fixing ring by spot welding.

In some embodiments, more than two U-shaped support strips are provided, and bottoms of adjacent two U-shaped support strips are fixed by spot welding.

In some embodiments, more than two U-shaped support strips are provided, and the U-shaped support strips uniformly cross each other at midpoints of bottoms thereof.

In some embodiments, an upper surface and a lower surface of a bottom of each U-shaped support strip are provided with an inner recess and an outer protrusion respectively, and positions of the inner recess and the outer protrusion correspond to each other, adjacent two U-shaped support strips are positioned by means of cooperation between the inner recess and the outer protrusion; or an upper surface and a lower surface of a bottom of each U-shaped support strip are provided with an outer protrusion and an inner recess respectively, and positions of the outer protrusion and the inner recess correspond to each other, adjacent two U-shaped support strip are positioned by means of cooperation between the inner recess and the outer protrusion.

In some embodiments, the circumferential edge of the opening is bent into an annular body in a radial direction, and the annular body is interposed between the inner fixing ring and the outer fixing ring.

In some embodiments, the cylindrical filter screen has a conical or cylindrical vertical section.

In some embodiments, the outer fixing ring includes an outer bottom ring body and an outer side ring body, and the outer side ring body is connected to a circumferential edge of the outer bottom ring body and extending in an axial direction, and the inner fixing ring includes an inner bottom ring body and an inner side ring body, and the inner side ring body is connected to a circumferential edge of the inner bottom ring body and extends in the radial direction; and the inner side ring body abuts against an inner surface of the outer side ring body, the inner bottom ring body abuts against an upper surface of the outer bottom ring body and is fixed to the outer bottom ring body by spot welding, and the circumferential edge of the opening is interposed between the inner bottom ring body and the outer bottom ring body.

A manufacturing method for a filter according to embodiments of the disclosure includes: providing a material free of spraying and integrally forming a casing from the material free of spraying at S01; necking a first axil end of the casing to form a neck section at S02; providing a filter screen assembly, pressing the filter screen assembly in through a second axial end of the casing and enabling the filter screen assembly to be fitted with and connected to an inner wall of the casing at S03; necking the second axial end of the casing to form another neck section at S04; and connecting transition tubes to the neck sections at two axial ends of the casing respectively at S05.

The manufacturing method for a filter according to embodiments of the present disclosure is simple in steps and high in production efficiency.

In some embodiments, at S03, the filter screen assembly is fixed to an inner wall of the casing by welding.

In some embodiments, at S03, at least one annular groove sunken towards the inner wall of the casing is defined on an outer wall of the casing by punching, the inner wall of the casing protrudes to form an annular protrusion with the annular groove, and the filter screen assembly is connected to the annular protrusion by snapping.

In some embodiments, at S03, one annular groove sunken towards the inner wall of the casing is defined on the outer wall of the casing by punching, the inner wall of the casing protrudes to form the annular protrusion with the annular groove, when the filter screen assembly is pressed into the casing, an end of the filter screen assembly is flush with the annular protrusion, another one annular groove sunken towards the inner wall of the casing is defined on the outer wall of the casing by punching, the inner wall of the casing protrudes to form another annular protrusion with the another annular groove, and the two annular protrusions hold the end of the filter screen assembly.

In some embodiments, at S01, material free of spraying is stainless steel or copper.

In some embodiments, at S05, the transition tube is fixed to the neck section by spot welding.

In some embodiments, at S05, the transition tube is welded to the neck section at a temperature higher than 810° C.

An air conditioner according to embodiments of the present disclosure comprises: a refrigerant tube and the filter according to other embodiments, and the refrigerant tube is fixedly connected to the transition tube.

Since the air conditioner to embodiments of the present disclosure is provided with the above filter, the production efficiency of the filter of the air conditioner can be raised.

BRIEF DESCRIPTION OF THE DRAWINGS

Embodiments of the present application are described in the drawings.

REFERENCE NUMERALS

Figure 1:
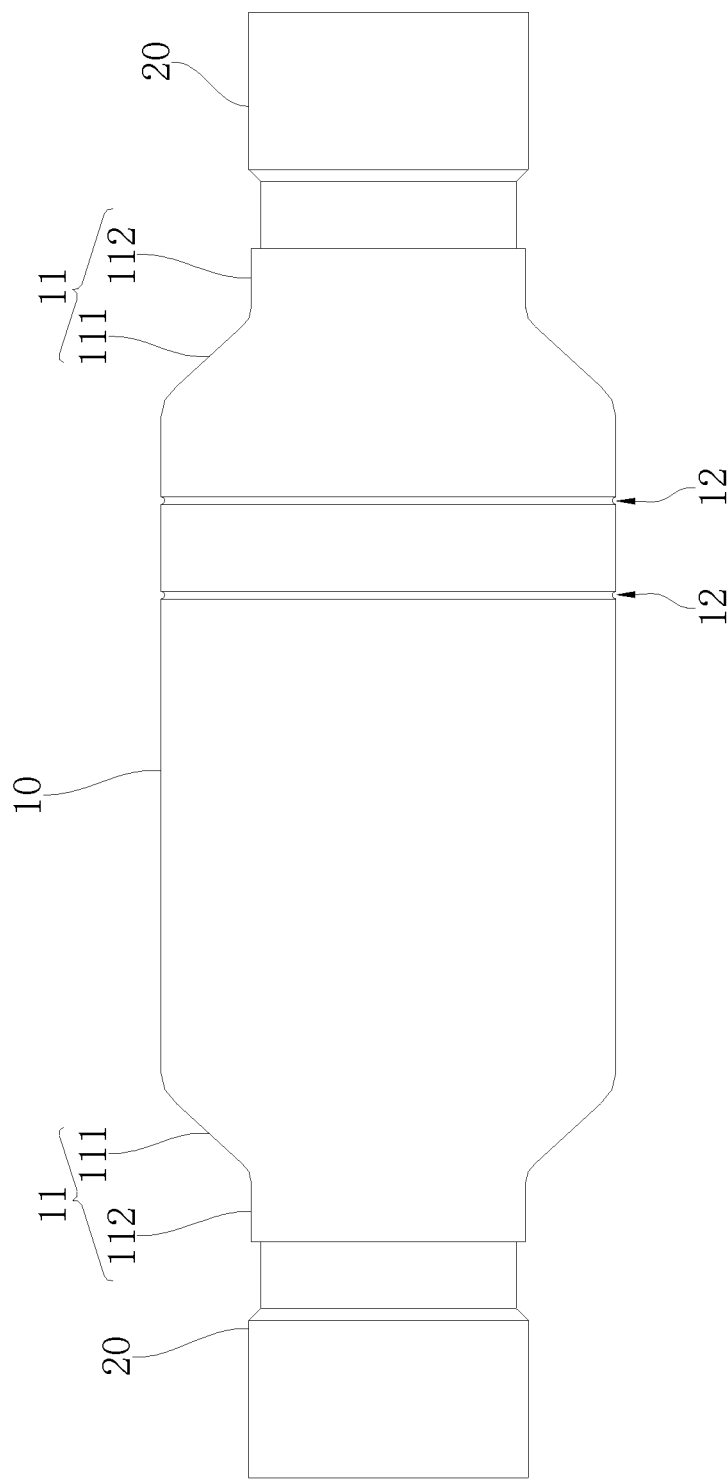
FIG. 1 is a schematic view of a filter provided by embodiments of the present disclosure.

10—casing 11—neck section 12—annular groove 111—tapered section 112—straight tube section 13—annular protrusion 20—transition tube 21—drawing lines 22—connecting section 23—covering section 30—filter screen assembly 40—refrigerant tube 3010—cylindrical filter screen 3011—opening 3012—annular body 3020—outer fixing ring 3021—outer bottom ring body 3022—outer side ring body 3030—inner fixing ring 3031—inner bottom ring body 3032—inner side ring body 3040—support 3041—U-shaped support strip 30411—edgefold 30412—inner recess 30413—outer protrusion

DETAILED DESCRIPTION OF THE INVENTION

The embodiments of the present disclosure are described in detail, examples of the embodiments are shown in the drawings. The same or similar elements and the elements having same or similar functions are denoted by like reference numerals throughout the descriptions. The embodiments described herein with reference to drawings are explanatory and intend to understand the present disclosure. The embodiments shall not be construed to limit the present disclosure.

In the specification, it is to be understood that terms such as "length," "width," "upper," "lower," "front," "rear," "left," "right," "vertical," "horizontal," "top," "bottom," "inner," and "outer," should be construed to refer to the orientation as then described or as shown in the drawings under discussion. These relative terms are for convenience of description and do not require that the present invention be constructed or operated in a particular orientation.

In addition, terms such as "first" and "second" are used herein for purposes of description and are not intended to indicate or imply relative importance or significance or to imply the number of indicated features. Thus, the feature defined with "first" and "second" may comprise one or more of this feature. In the description of the present invention, the term "a plurality of" means two or more than two, unless specified otherwise.

In the present invention, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements according to specific situations.

First Embodiment

Figure 2:
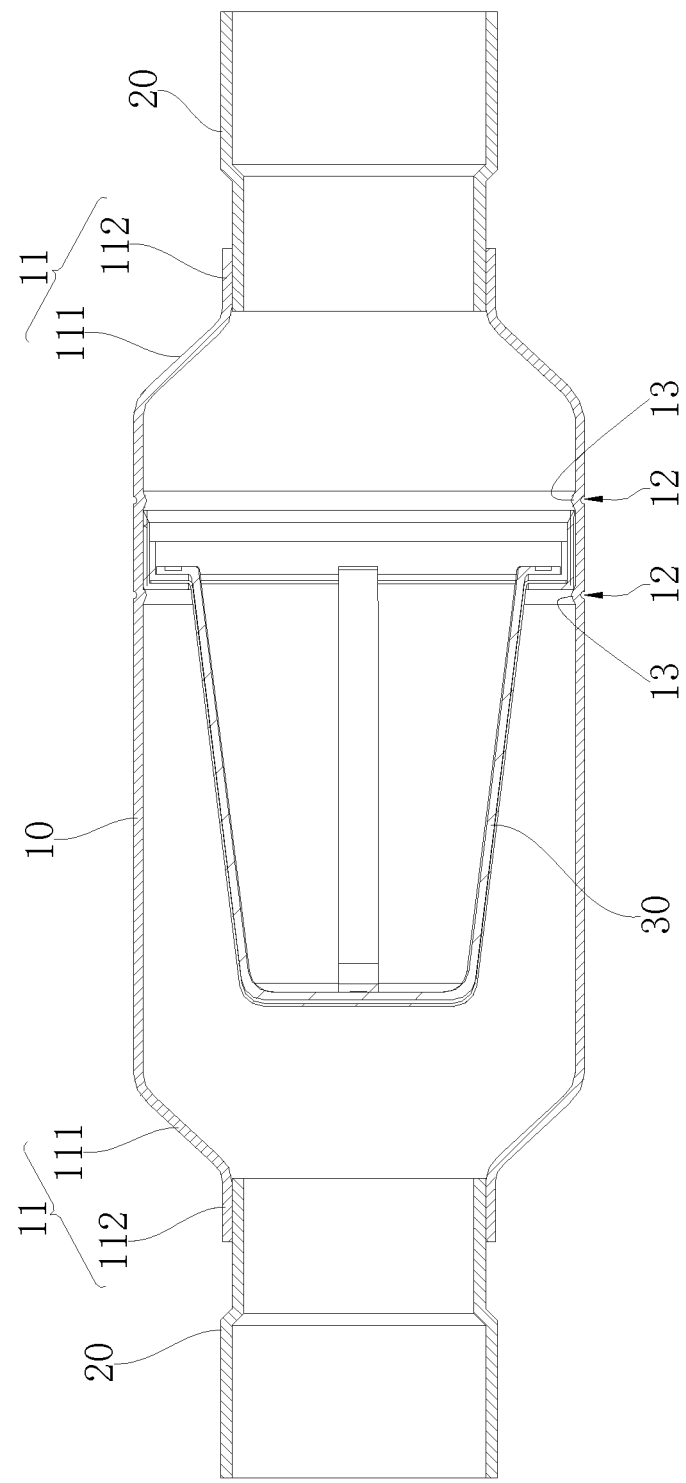
FIG. 2 is a sectional view of a filter provided by embodiments of the present disclosure.

As shown in FIGS. 1 to 2, a filter provided by embodiments of the present disclosure is mainly used in an air conditioner and for connecting a refrigerant tube 40. In one embodiment, the filter includes a casing 10, a transition tube 20 and a filter screen assembly 30. The filter screen assembly 30 is arranged in the casing 10 and is fitted with and connected to an inner wall of the casing 10. That the filter screen assembly 30 is fitted with and connected to the inner wall of the casing 10 refers to non-detachable connection or detachable connection. The casing 10 is an integrally formed piece. Since the casing 10 is the integrally formed piece, integrally formed manufacturing can be achieved instead of splicing structures of carbon steel. The integrally formed piece can be made of other new material, may be stainless steel or copper, free of spraying other than structures of carbon steel, to improve corrosion resistant performance of the casing 10.

Figure 3:
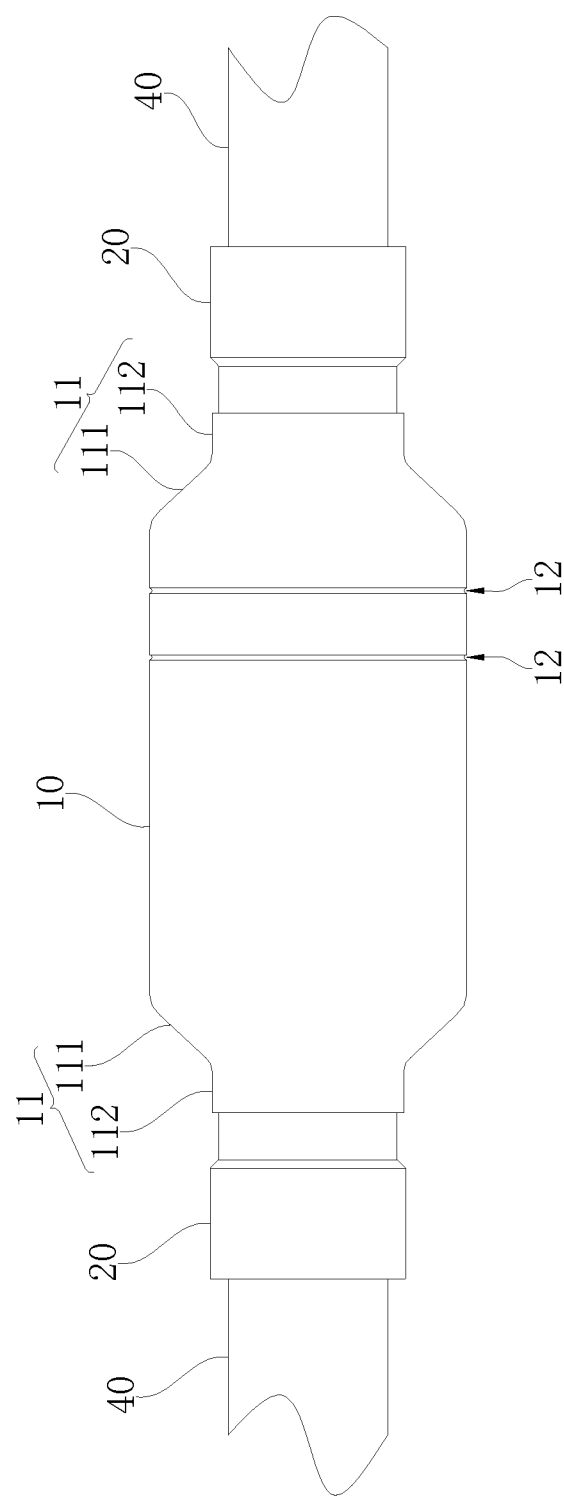
FIG. 3 is a schematic view of a filter connected to a refrigerant tube provided by embodiments of the present disclosure.

Furthermore, as shown in FIGS. 1 to 3, each of two axial ends of the casing 10 has a neck section 11. With neck sections 11 at two axial ends of the casing 10, comparatively small joints can be formed at the two axial ends of the casing 10, sizes of the two neck sections 11 matches sizes of a mouth of the transition tube 20, and the casing 10 is easy to fixedly connected to the transition tube 20.

With the filter of embodiments of the present disclosure, the casing 10 is the integrally formed piece, splicing process is needless, on the premise that the strength and filtering effects of the filter are satisfied, steps for manufacturing the casing 10 can be simplified, and the production efficiency of the casing 10 can be raised. Meanwhile, the integrally formed piece can be made of new materials besides structures of carbon steel, it is needless to add a coating on an outer surface of the casing 10, corrosion resistance is no longer good, and a process for spraying is saved, to raise the production efficiency of the filter.

In one embodiment, after the casing 10 is integrally formed by new materials, an axial end of the casing 1 is necked, and then the neck section 11 is formed at the end; the other axial end of the filter screen assembly 30 which is not been necked yet is pressed into the casing 10, and the filter screen assembly 30 is fixedly connected to the inner wall of the casing 10; and finally the other axial end of the filter screen assembly 30 which is not necked yet is necked, and transition tubes 20 are fixedly connected to the two neck sections 11. With the transition tube 20, the filter can be conveniently connected to the refrigerant tube 40.

In some embodiments, as shown in FIGS. 1 to 3, the neck section 11 comprises a tapered section 111 having a gradually reduced diameter and a straight tube section 112. The straight tube section 112 is connected to the tapered section 111 and arranged in an axial direction. The transition tube 20 is fixedly connected to the straight tube section 112. In one embodiment, the tapered section 111 having the gradually reduced diameter can make the casing 10 have gradually reduced spaces adjacent to the two axial ends thereof, which effectively prevents the filter screen assembly 30 fixed in the casing 10 from falling out from two ends of the casing 10. In addition, the casing 10 transmit from the tapered section 111 to the straight tube section 112 smoothly, and can be adapt to be connected to the transition tube 20 via the straight tube section 112. Since the transition tube 20 is comparatively small, an auxiliary adaptor can be saved by means of the straight tube section 112, the transition tube 20 can be fixedly connected to the casing 10 via connection between the straight tube section 112 and the transition tube 20.

In some embodiments, a manner for fixedly connected the transition tube 20 to the straight tube section 112 is welding. The transition tube 20 is fixed to the straight tube section 112 by welding can ensure good and stable connection and durable performance. In addition, because the welding process is simple and easy to operate, the transition tube 20 and the straight tube section 112 can be quickly assembled during manufacturing with high production efficiency.

In addition, the transition tube 20 is welded to the straight tube section 112 at a temperature higher than 810° C., since the straight tube section 112 is a part of the casing 10, the welding temperature is higher than 810° C. during welding operation on the transition tube 20 and the casing 10, the transition tube 20 is fixed at a high temperature, and the welding temperature is much lower than 810° C. when the filter is welded to the refrigerant tube 40 in the latter. The temperature at which the refrigerant tube 40 is welded does not affect stability of the welding position between the transition tube 20 and the casing 10, risks of leakage between the casing 10 and the transition tube 20 due to welding the refrigerant tube 40 can be effectively avoided.

Figure 4:
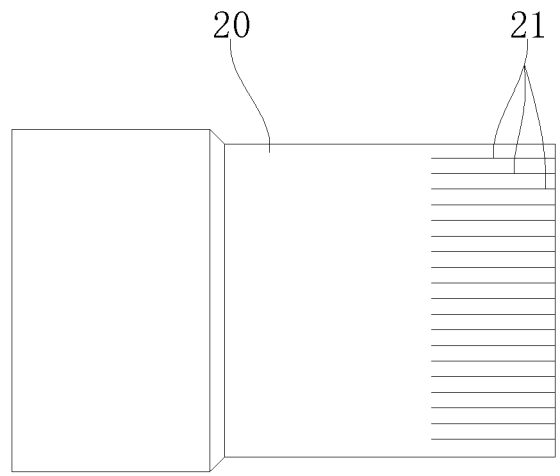
FIG. 4 is a schematic view of a transition tube of a filter provided by embodiments of the present disclosure.

Furthermore, as shown in FIG. 2 and FIG. 4, the transition tube 20 is embedded in to the straight tube section 112, and the transition tube 20 is provided with drawing lines 21 at an outer wall in contact with the straight tube section 112. That means the outer wall of a part of the transition tube 20 embedded into the straight tube section 112 is provided with the drawing lines 21, and the drawing lines 21 can be formed by wire drawing process. With such design, during welding the transition tube 20 and the straight tube section 112, a welding flux can be well arranged through the drawing lines 21 on the transition tube 20, the welding flux and a contact area between the straight tube section 112 and the transition tube 20 can be increased, stability and reliability of the transition tube 20 and the straight tube section 112 can be greatly improved after the are fixed by welding.

Figure 5:
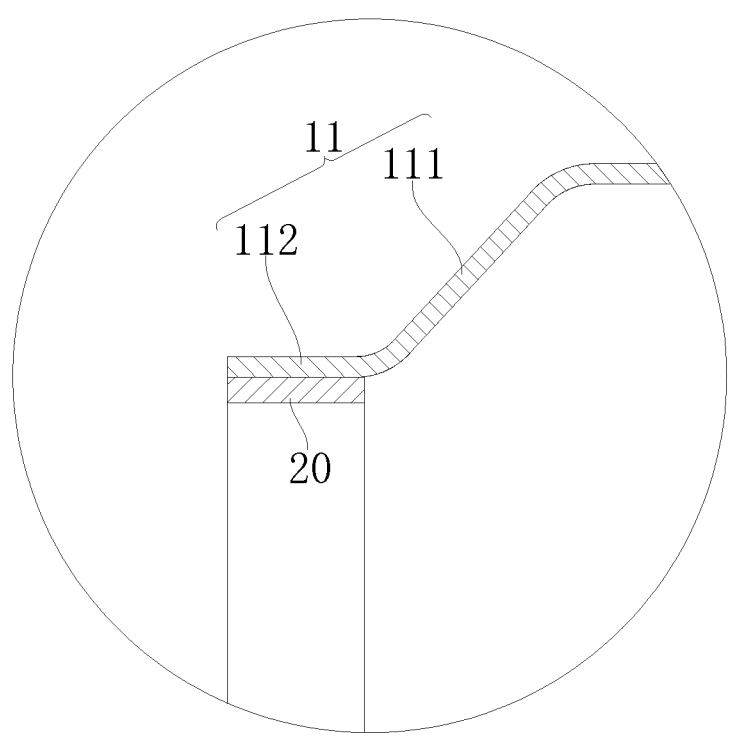
FIG. 5 is a schematic view of a first connection manner between a transition tube and a casing of a filter provided by embodiments of the present disclosure.

In some embodiments, as shown in FIG. 5, a first structure for the transition tube 20 is that an outer end of the transition tube 20 is flush with an end of the straight tube section 112. In one embodiment, the transition tube 20 of this structure is entirely embedded into the straight tube section 112 and fixed to the straight tube section 112 by welding. In such manner, in the condition that the filter has a constant total length, the casing 10 can be designed longer, that means the length of the casing 10 is enlarged, the filter screen assembly 30 provided in the casing 10 can be designed to have a larger size, then the filter screen assembly 30 has an increased effective filtering area, and the filtering quality is improved.

Figure 6:
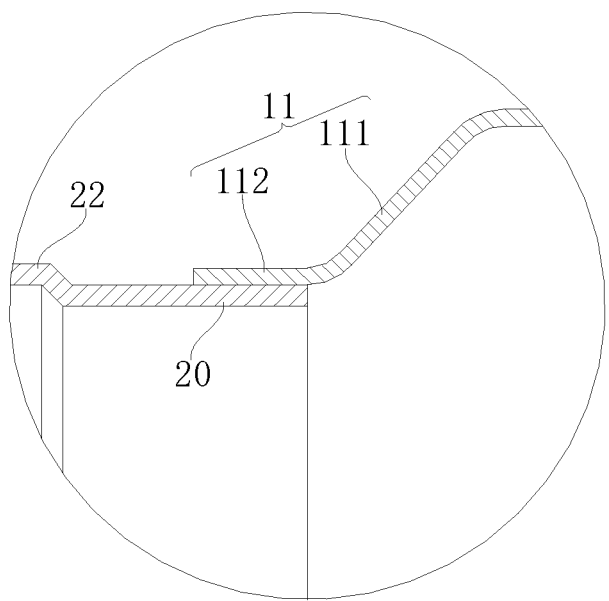
FIG. 6 is a schematic view of a second connection manner between a transition tube and a casing of a filter provided by embodiments of the present disclosure.

In some embodiments, as shown in FIG. 6, a second structure for the transition tube 20 is that and outer end of the transition tube 20 extends out of the straight tube section 112 and forms a connecting section 22. In one embodiment, the transition tube 20 of this structure has a connecting section 22 extending out of the straight tube section 112 at a predetermined distance, and the connecting section 22 can be used to connect the refrigerant tube 40. An size of the connecting section 22 can be designed as an optimized size to adapt to connection with the refrigerant tube 40, which is convenient to mount and will not be affected by a size of the straight tube section 112.

Figure 7:
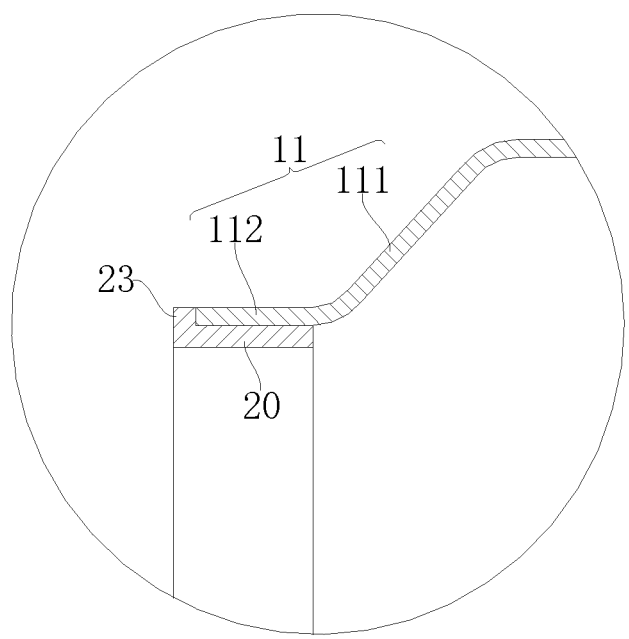
FIG. 7 is a schematic view of a third connection manner between a transition tube and a casing of a filter provided by embodiments of the present disclosure.

In some embodiments, as shown in FIG. 7, a third structure for the transition tube 20 is that an outer of the transition tube 20 extends out of the straight tube section 112 and forms a covering section 23, the covering section 23 abuts against an end of the straight tube section 112, and an outer wall of the covering section 23 is flushed with an outer wall of the straight tube section 11. In one embodiment, the transition tube 20 of this structure has the covering section 23 used to cover the end of the straight tube section 112, the end of the straight tube section 112 can be isolated by the covering section 23, in such manner, the welding flux can be prevented from contacting the straight tube section 112 when the transition tube 20 is welded to the refrigerant tube 40, which raises the welding quality.

In some embodiments, the filter screen assembly 30 can be fixedly connected to the inner of the casing 10 at least by the two manners as follows.

According to a first manner, the filter screen assembly 30 is fixed to the inner wall of the casing 10 by welding. Because the filter screen assembly 30 is fixed to the inner wall of the casing 10 by welding, it can be ensured that the fixation of the filter screen assembly 30 on the inner wall of is stable and reliable, and the filter screen assembly 30 is not easy to fall off after fixation.

According to a second manner, as shown in FIG. 2, at least one annular groove 12 sunken towards the inner wall of the casing 10 is defined on the outer wall of the casing 10 by punching. The inner wall of the casing 10 is provided with an annular protrusion 13 protruding out at a position corresponding to the annular groove 12. The filter screen assembly 30 is connected to the annular protrusion 13 by snapping. The annular groove 12 is defined on the outer wall of the casing 10 by punching, the annular groove 12 is sunken to form the annular protrusion 13 in the casing 10. When the filter screen assembly 30 is provided in the casing 10, a structure of the filter screen assembly 30 for implementing embedding connection and the annular protrusion 13 can be connected by snapping, the filter screen assembly 30 can be fixed, and the assembling is convenient.

In addition, the annular protrusion 13 can also serves for positioning and mounting, the annular groove 12 can play a role of limiting and indicating a mounting position of the filter screen assembly 30.

The number of the annular groove 12 can be set as two, or there, or more than three according to actual needs, similarly, two, or three, or more than three annular protrusions 13 are formed.

Second Embodiment

As shown in FIGS. 8 to 12, a filter screen assembly 30 provided by embodiments of the present disclosure comprises a cylindrical filter screen 3010, an outer fixing ring 3020, an inner fixing ring 3030 and a support 3040. The inner fixing ring 3030 is fixedly connected in the outer fixing ring 3020, and the inner fixing ring 3030 can be connected to the outer fixing ring 3020 by embedding or welding. On the one hand, the inner fixing ring 3030 is used to clamp and fix the cylindrical filter screen 3010, one the other hand, the inner fixing ring 3030 is used to connected to the support 3040. The cylindrical filter screen 3010 has an opening 3011, a circumferential edge of the opening 3011 is interposed between the inner fixing ring 3030 and the outer fixing ring 3020. The support 3040 comprises at least one U-shaped support strip 3041, each U-shaped support strip 3041 and extends into the cylindrical filter screen 3010 through the opening 3011 and supports the cylindrical filter screen 3010, and two tail ends of each U-shaped support strip 3041 are both fixedly connected to the inner fixing ring 3030, the cylindrical filter screen 3010 is fixed by the inner fixing ring 3030 and the outer fixing ring 3020, and is supported by the support 3040 to be kept in a cylindrical state, to effectively show its filtering effect.

Figure 10:
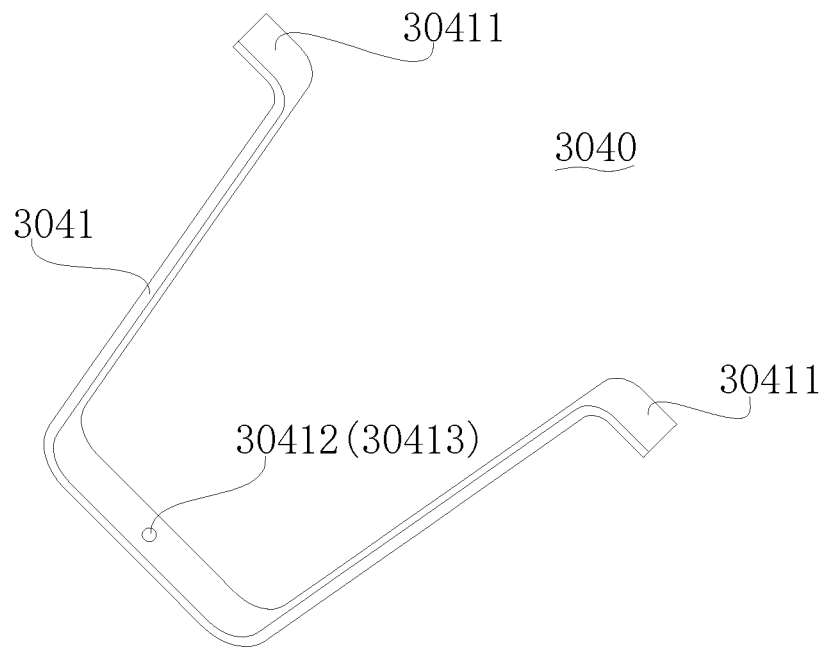
FIG. 10 is a schematic view of a support of a filter screen assembly according to a first implementation provided by embodiments of the present disclosure.
Figure 11:
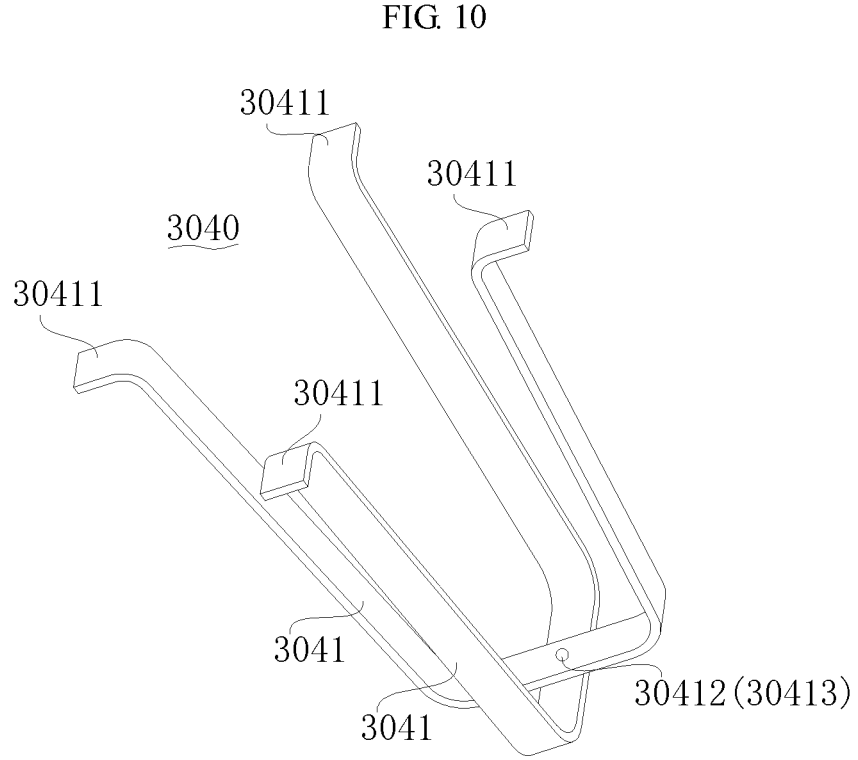
FIG. 11 is a schematic view of a support of a filter screen assembly according to a second implementation provided by embodiments of the present disclosure.
Figure 12:
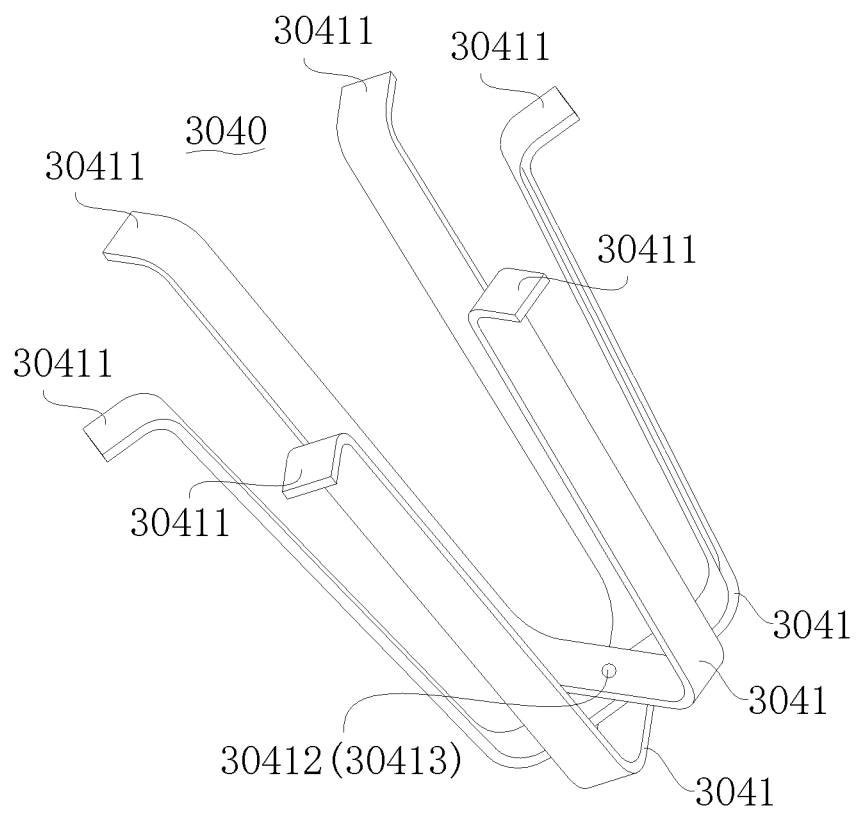
FIG. 12 is a schematic view of a support of a filter screen assembly according to a third implementation provided by embodiments of the present disclosure.

The number of the U-shaped support strip 3041 can be set according to actual needs. As shown in FIGS. 10 to 11, may be one, or two, or three, or more than three U-shaped support strips are provided for example. In addition, each U-shaped support strip 3041 is used for supporting separately. If more than two U-shaped support strips 3041 are provided, the U-shaped support strips are assembled and connected after each single U-shaped support strip 3041 is manufactured, there is no need to integrally form the support 3040, material waste can be reduced to the minimum. At the meantime, length elongation can be implemented during manufacturing due to the single U-shaped support strip 3041 has a small structure. The support 3040 formed in this manner can have a longer length, correspondingly, the cylindrical filter screen 3010 can be designed to have a longer length, and the cylindrical filter screen 3010 is lager in effective filtering area.

As for the filter screen assembly 30 of embodiments of the present disclosure, since the support 3040 is formed by connecting at least one U-shaped support strip 3041, there is no need to integrally form the support 3040, each single U-shaped support strip 3041 can be manufactured separately. In such manner, not only material waste caused by that the support 3040 is integrally formed can be reduced. In the meantime, length elongation can be implemented during manufacturing due to the single U-shaped support strip 3041 has an elongated structure. The support 3040 manufactured by the U-shaped support strip 3041 can have a longer length, the cylindrical filter screen 3010 can be designed to have a larger size, and the cylindrical filter screen 3010 which can be supported by the support 3040 is lager in effective filtering area, and the filtering effect of the filter screen assembly 30 can be greatly improved.

In some embodiments, two tail end of each U-shaped support strip 3041 are both bent into edgefolds 30411, and the edgefolds 30411 abut against the inner fixing ring 3030 and are fixed to the inner fixing ring 3030 by spot welding. In one embodiment, the edgefolds 30411 can abut against the inner fixing ring 3030, one the one hand positioning is achieved, and one the other hand the contact area between the edgefolds and the inner fixing ring 3030 can be increased. The edgefold 30411 is fixed to the inner fixing ring 3030 by once-through spot welding, the connection is good in stability.

In some embodiments, more than two U-shaped support strips 3041 are provided, and bottoms of adjacent two U-shaped support strips 3041 are fixed by spot welding. When more than two U-shaped support strips 3041 are provided, two adjacent (upper and down) support stripes are fixed together by once-through spot welding, the operation is simple and convenient, and the connection is good in stability.

In some embodiments, more than two U-shaped support strips 3041 are provided, the U-shaped support strips 3041 uniformly cross each other at midpoints of bottoms thereof. With such design, the U-shaped support strips 3041 of the support 3040 are uniformly and radially distributed about a center, i.e. the midpoints of the bottoms. After the support supports the cylindrical filter screen 3010 in this manner, the cylindrical filter screen 3010 can be supported at positions with uniform force.

In some embodiments, as shown in FIGS. 8 to 12, an upper surface and a lower surface of a bottom of each U-shaped support strip 3041 are provided with an inner recess 30412 and an outer protrusion 30413 respectively, and positions of the inner recess 30412 and the outer protrusion 30413 correspond to each other, adjacent two U-shaped support strips 3041 are positioned by means of cooperation between the inner recess 30412 and the outer protrusion 30413. In one embodiment, an upper surface and a lower surface of a bottom of each U-shaped support strip 3041 are provided with an outer protrusion 30413 and an inner recess 30412 respectively, and positions of the outer protrusion 30413 and the inner recess 30412 correspond to each other, adjacent two U-shaped support strip 3041 are positioned by means of cooperation between the inner recess 30412 and the outer protrusion 30413. That means, when more than two U-shaped support strips 3041 are provided, bottoms of the two adjacent U-shaped support strips 3041 in an up-down direction are positioned by means of cooperation between the outer protrusion 30413 and the inner recess 30412, and then the two adjacent U-shaped support strips 3041 in an up-down direction are fixed by spot welding, the U-shaped support strips 3041 can be conveniently assembled, in addition, the assembled support 3040 is good in uniformity and better in quality.

Figure 8:
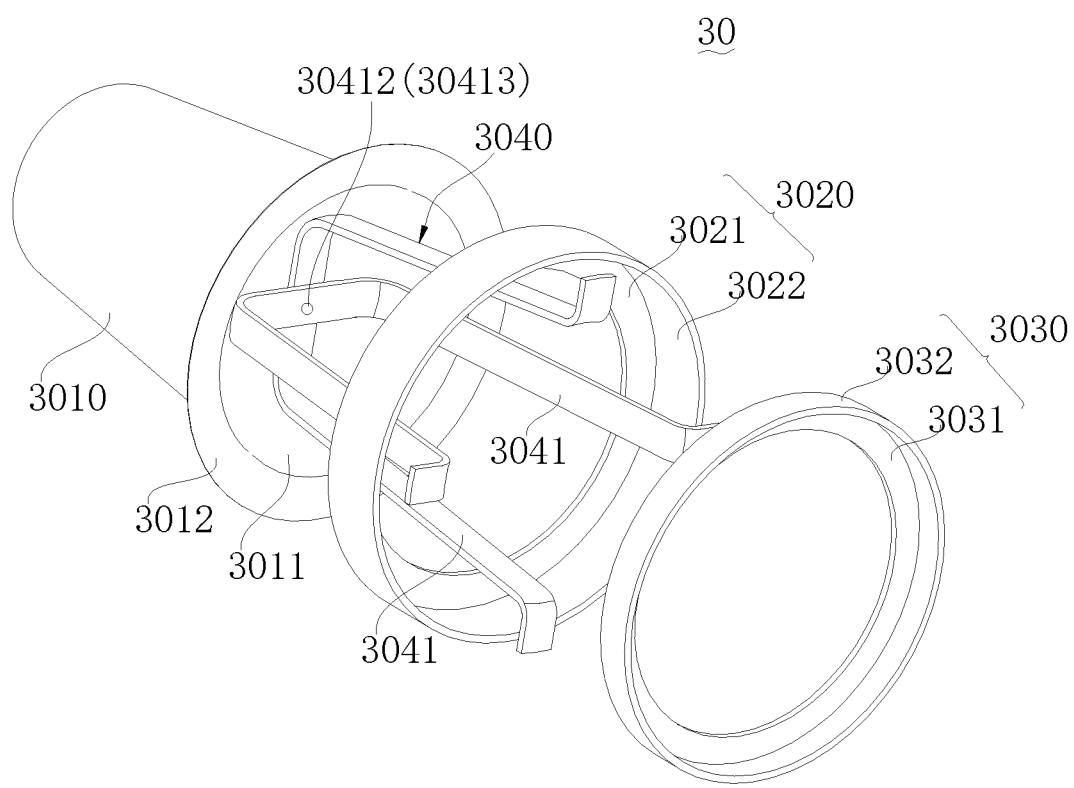
FIG. 8 is an exploded view of a filter screen assembly provided by embodiments of the present disclosure.
Figure 9:
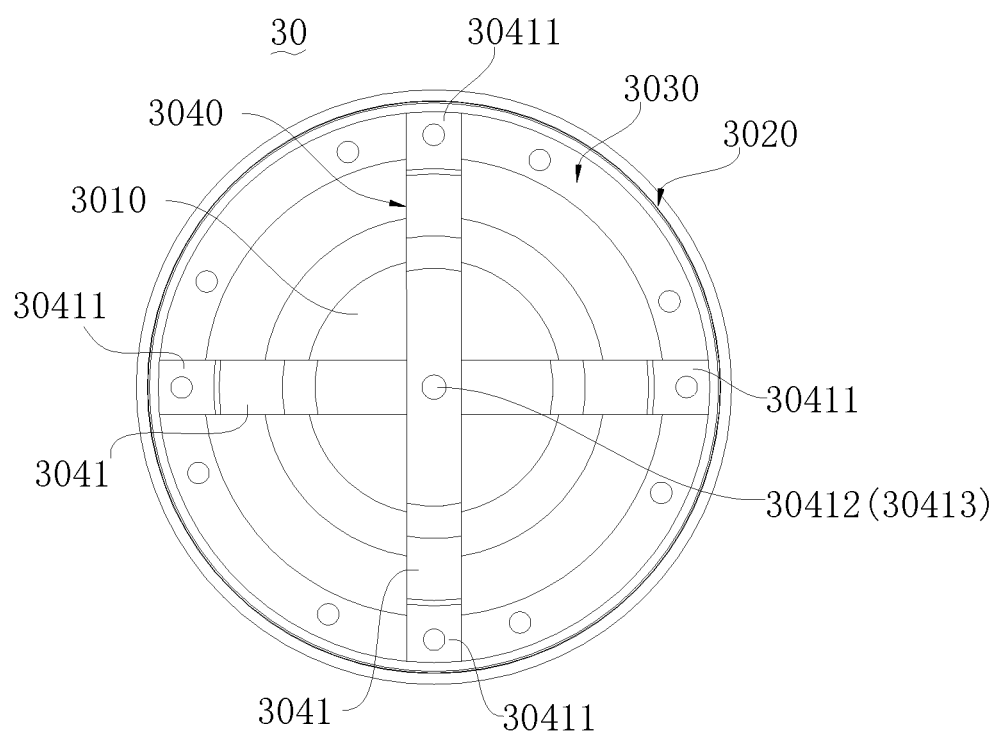
FIG. 9 is a schematic view of a filter screen assembly provided by embodiments of the present disclosure.

As shown in FIG. 8, in some embodiments, a circumferential edge of the opening 3011 is bent into an annular body 3012 in a radial direction, the annular body 3012 is interposed between the inner fixing ring 3030 and the outer fixing ring 3020. In one embodiment, by arranging the annular body 3012 between the inner fixing ring 3030 and the outer fixing ring 3020, the inner fixing ring 3030 and the outer fixing ring 3020 tightly press the annular body 3012 after the inner fixing ring 3030 and the outer fixing ring 3020 are fixedly connected together by spot welding, the cylindrical filter screen 3010 is fixed.

The annular body 3012 is a part of the cylindrical filter screen 3010, the annular body 3012 is bent in a radial direction at a circumferential edge of the opening 3011 to include an angle about 90 degrees together with the cylindrical filter screen 3010.

In one embodiment, the cylindrical filter screen 3010 has a conical or cylindrical vertical section. An inner diameter of the opening 3011 of the cylindrical filter screen 3010 is greater than or equal to an inner diameter of another end opposite the opening 3011 of the cylindrical filter screen 3010.

As shown in FIG. 8, in some embodiments, the outer fixing ring 3020 comprises an outer bottom ring body 3021 and an outer side ring body 3022, the outer side ring body 3022 is connected to a circumferential edge of the outer bottom ring body 3021 and extends in a radial direction. The outer side ring body 3022 and the outer bottom ring body 3021 are integrally formed as the outer fixing ring 3020. The inner fixing ring 3030 comprises an inner bottom ring body 3031 and an inner side ring body 3032, and the inner side ring body 3032 is connected to a circumferential edge of the inner bottom ring body 3031 and extends in the radial direction. The inner side ring body 3032 and the inner bottom ring body 3031 are integrally formed as the inner fixing ring 3030.

Furthermore, the inner side ring body 3032 abuts against an inner surface of the outer side ring body 3022, the inner side ring body 3032 is fitted with the outer side ring body 3022 to limit each other to achieve positioning. The inner bottom ring body 3031 abuts against an upper surface of the outer bottom ring body 3021 and is fixed to the outer bottom ring body 3021 by spot welding. A plurality of spot welding points are distributed in an annular manner, and the inner bottom ring body 3031 is fixed to the outer bottom ring body 3021 by spot welding. On the one hand, operation is easy, and on the other hand, connection can be ensured to be good in stability. The circumferential edge of the opening 3011 is interposed between the inner bottom ring body 3031 and the outer bottom ring body 3021. In one embodiment, the annular body 3012 provided on the circumferential edge of the opening 3011 is interposed between the inner bottom ring body 3031 and the outer bottom ring body 3021, the annular body 3012 is fixed by clamping force generated by the welded the inner bottom ring body 3031 and the outer bottom ring body 3021, and the cylindrical filter screen 3010 is fixed in such manner.

As shown in FIG. 2, since the filter of embodiments of the present disclosure is provided with the filter screen assembly 30 described above, because the support 3040 can be manufactured to have a longer length without increase in cost, correspondingly the cylindrical filter screen 3010 can be designed to have a larger size, the filter screen assembly 30 has a better filtering effect and the filter is better in filtering.

Third Embodiment

As shown in FIGS. 1 to 3, this embodiment provides a manufacturing method for a filter. The manufacturing method comprises the following steps.

At S01, a material free of spraying is provided, and a casing 10 is integrally formed from the material free of spraying.

At S02, a first axil end of the casing 10 is necked to form a neck section 11.

At S03, a filter screen assembly 30 is provided, the filter screen assembly 30 is pressed in through a second axial end of the casing 10 and fitted with and connected to an inner wall of the casing 10.

At S04, the second axial end of the casing 10 is necked to form a neck section 11.

At S05, the neck sections 11 at two axial ends of the casing 1 are connected to transition tubes 20 respectively. The transition tubes 20 are used for connecting to a refrigerant tube 40.

As for the filter manufactured by the manufacturing method for a filter of embodiments of the present disclosure, the casing 10 is integrally manufactured by a new material other than carbon steel, splicing process is needless, on the premise that the strength and filtering effects of the filter are satisfied, steps for manufacturing the casing 10 can be simplified, and the production efficiency of the casing 10 can be raised. Meanwhile, corrosion resistance of the casing is improved, the outer surface of the casing 10 needs no sprayed coating, and a process for spraying is saved, to raise the production efficiency of the filter.

At S03 of this embodiment, the fitting between the filter screen assembly 30 and the inner wall of the casing 10 at least can be achieved by the following two manners.

According to a first manner, the filter screen assembly 30 is fixed to the inner wall of the casing 10 by welding. Because the filter screen assembly 30 is fixed to the inner wall of the casing 10 by welding, it can be ensured that the fixation of the filter screen assembly 30 on the inner wall of is stable and reliable, and the filter screen assembly 30 is not easy to fall off after fixation.

According to a second manner, at least one annular groove 12 sunken towards the inner wall of the casing 10 is defined on an outer wall of the casing 10 by punching, the inner wall of the casing 10 protrudes to form an annular protrusion 13 with the annular groove 12. The filter screen assembly 30 is connected to the annular protrusion 13 by snapping. In one embodiment the annular groove 12 is defined on the outer wall of the casing 10 by punching, the annular groove 12 is sunken to form the annular protrusion 13 in the casing 10. When the filter screen assembly 30 is provided in the casing 10, a structure of the filter screen assembly 30 for implementing embedding connection and the annular protrusion 13 can be connected by snapping, the filter screen assembly 30 can be fixed, and the assembling is convenient.

In addition, the annular protrusion 13 can also serves for positioning and mounting, the annular groove 12 can play a role of limiting and indicating a mounting position of the filter screen assembly 30.

The number of the annular groove 12 can be set as two, or there, or more than three according to actual needs, similarly, two, or three, or more than three annular protrusions 13 are formed.

In one embodiment, at S03, one annular groove 12 sunken towards the inner wall of the casing 10 is defined on an outer wall of the casing 10 by punching, the inner wall of the casing 10 protrudes to form an annular protrusion 13 with the annular groove 12. When the filter screen assembly 30 is pressed into the casing 10, an end of the filter screen assembly 30 is flush with the annular protrusion 13. Another one annular groove 12 sunken towards the inner wall of the casing 10 is defined on an outer wall of the casing 10 by punching, the inner wall of the casing 10 protrudes to form an annular protrusion 13 with the annular groove 12. The two annular protrusions 13 hold the end of the filter screen assembly 30, the end of the filter screen assembly 30 is snapped to the inner wall of the casing 10.

Furthermore, at S05, the transition tube 20 is fixed to the neck section 11 by welding, and stability of connection between the transition tube 20 and the neck section 11 can be enhanced by welding.

Furthermore, at S05, the transition tube 20 is welded to the straight tube section 112 at a temperature higher than 810° C., since the straight tube section 112 is a part of the casing 10, the welding temperature is higher than 810° C. during welding operation on the transition tube 20 and the casing 10, the transition tube 20 is fixed at a high temperature, and the welding temperature is much lower than 810° C. when the filter is welded to the refrigerant tube 40 in the latter. The temperature at which the refrigerant tube 40 is welded does not affect stability of the welding position between the transition tube 20 and the casing 10, risks of leakage between the casing 10 and the transition tube 20 due to welding the refrigerant tube 40 can be effectively avoided.

In one embodiment, at S01, the material free of spraying is stainless steel or copper. The integrally formed casing 10 made of steel or copper can effective improve corrosion resistant performance of the casing 10.

Fourth Embodiment

This embodiment provides an air conditioner, and the air conditioner comprises a refrigerant tube 40 and the above filter. The refrigerant tube 40 is fixedly connected to the transition tube 20. In one embodiment, the air conditioner of embodiments of the present disclosure is provided with the above filter, the production efficiency of the filter of the air conditioner can be increased, and the casing 10 of the filter is integrally formed of new material other than carbon steel, a coating is no longer needed to be sprayed on the outer of the casing 10, risks of leakage connection between the casing 10 and the transition tube 20 because the coating on the casing is easy to burn out is reduced, the air conditioner can be used more safely.

To sum up, the present application aims to provide a filter, a manufacturing method for the filter, and an air conditioner, in order to overcome defects in the related art that the manufacturing processes are complex, the production efficiency is low, and the coating on the surface is easy to burn off due to that the filter is spliced by carbon steel.

The present disclosure brings about the beneficial effects as follows. The casing of the filter of the present disclosure is an integrally formed piece, splicing process is needless, on the premise that the strength and filtering effects of the filter are satisfied, steps for manufacturing the casing can be simplified, and the production efficiency of the casing can be raised. Meanwhile, the integrally formed piece is made of new materials with good corrosion resistance other than carbon steel, it is needless to add a coating on an outer surface of the casing, and a process for spraying is saved, to raise the production efficiency of the filter.

As for the filter manufactured by the manufacturing method for a filter of the present disclosure, the casing is an integrally formed piece made of new materials than carbon steel, splicing process is needless, on the premise that the strength and filtering effects of the filter are satisfied, steps for manufacturing the casing can be simplified, and the production efficiency of the casing can be raised. Meanwhile, the corrosion resistance of the casing is improved it is needless to add a coating on an outer surface of the casing, and a process for spraying is saved, to raise the production efficiency of the filter.

The air conditioner of the present disclosure is provided with the above filter, the production efficiency of the filter of the air conditioner can be raised. Meanwhile, the casing of the filter is integrally formed of new material other than carbon steel, a coating is no longer needed to be sprayed on the outer of the casing, risks of leakage at connection between the casing and the transition tube because the coating is easy to burn out is reduced, the air conditioner can be used more safely.

What is claimed is:

1. A filter, comprising:
a casing;
a transition tube; and
a filter screen assembly provided in the casing, fitted with and connected to an inner wall of the casing, the casing being an integrally formed piece, two axial ends of the casing have neck sections, and two neck sections being fixedly connected to the transition tube;
wherein at least one annular groove sunken towards the inner wall of the casing is defined on an outer wall of the casing by punching, the inner wall of the casing is provided with an annular protrusion protruding out at a position corresponding to the annular groove, and the filter screen assembly is connected to the annular protrusion by snapping.

2. The filter according to claim 1, wherein the neck section comprises a tapered section having a gradually reduced diameter and a straight tube section, the straight tube section is connected to the tapered section and arranged in an axial direction, and the transition tube is fixedly connected to the straight tube section, wherein an outer end of the transition tube is flushed with an end of the straight tube section.

3. The filter according to claim 2, wherein the transition tube is embedded into the straight tube section, and an outer wall of the transition tube in contact with the straight tube section is provided with brushed pattern.

4. The filter according to claim 2, wherein an outer end of the transition tube extends out of the straight tube section and forms a connecting section.

5. The filter according to claim 2, wherein an outer end of the transition tube extends out of the straight tube section and forms a covering section, the covering section abuts against an end of the straight tube section, and an outer wall of the covering section is flushed with an outer wall of the straight tube section.

6. The filter according to claim 1, wherein the casing is integrally formed from stainless steel or copper.

7. The filter according to claim 1, wherein the filter screen assembly comprises a cylindrical filter screen, an outer fixing ring, an inner fixing ring and a support; the inner fixing ring is fixedly connected into the outer fixing ring, the cylindrical filter screen has an opening, a circumferential edge of the opening is interposed between the inner fixing ring and the outer fixing ring; the support comprises at least one U-shaped support strip, each U-shaped support strip extends into the cylindrical filter screen through the opening and supports the cylindrical filter screen, and two tail ends of each U-shaped support strip are both fixedly connected to the inner fixing ring, wherein more than two U-shaped support strips are provided, and bottoms of adjacent two U-shaped support strips are fixed by spot welding.

8. The filter according to claim 7, wherein the two tail ends of each U-shaped support strip are both bent into edgefolds, and the edgefold abut against the inner fixing ring and are fixed to the inner fixing ring by spot welding.

9. The filter according to claim 7, wherein more than two U-shaped support strips are provided, and the U-shaped support strips uniformly cross each other at midpoints of bottoms thereof.

10. The filter according to claim 7, wherein an upper surface and a lower surface of a bottom of each U-shaped support strip are provided with an inner recess and an outer protrusion respectively, and positions of the inner recess and the outer protrusion correspond to each other, adjacent two U-shaped support strips are positioned by means of cooperation between the inner recess and the outer protrusion; or
an upper surface and a lower surface of a bottom of each U-shaped support strip are provided with an outer protrusion and an inner recess respectively, and positions of the outer protrusion and the inner recess correspond to each other, adjacent two U-shaped support strip are positioned by means of cooperation between the inner recess and the outer protrusion.

11. The filter according to claim 7, wherein the circumferential edge of the opening is bent into an annular body in a radial direction, and the annular body is interposed between the inner fixing ring and the outer fixing ring.

12. The filter according to claim 7, wherein the cylindrical filter screen has a conical or cylindrical vertical section.

13. The filter according to claim 7, wherein the outer fixing ring comprises an outer bottom ring body and an outer side ring body, and the outer side ring body is connected to a circumferential edge of the outer bottom ring body and extending in an axial direction, and the inner fixing ring comprises an inner bottom ring body and an inner side ring body, and the inner side ring body is connected to a circumferential edge of the inner bottom ring body and extends in a radial direction; and
the inner side ring body abuts against an inner surface of the outer side ring body, the inner bottom ring body abuts against an upper surface of the outer bottom ring body and is fixed to the outer bottom ring body by spot welding, and the circumferential edge of the opening is interposed between the inner bottom ring body and the outer bottom ring body.

* * * * *